Dec. 30, 1930.　　　E. F. PIERCE ET AL　　　1,786,548
PRESSURE LUBRICATING SYSTEM
Filed April 27, 1925
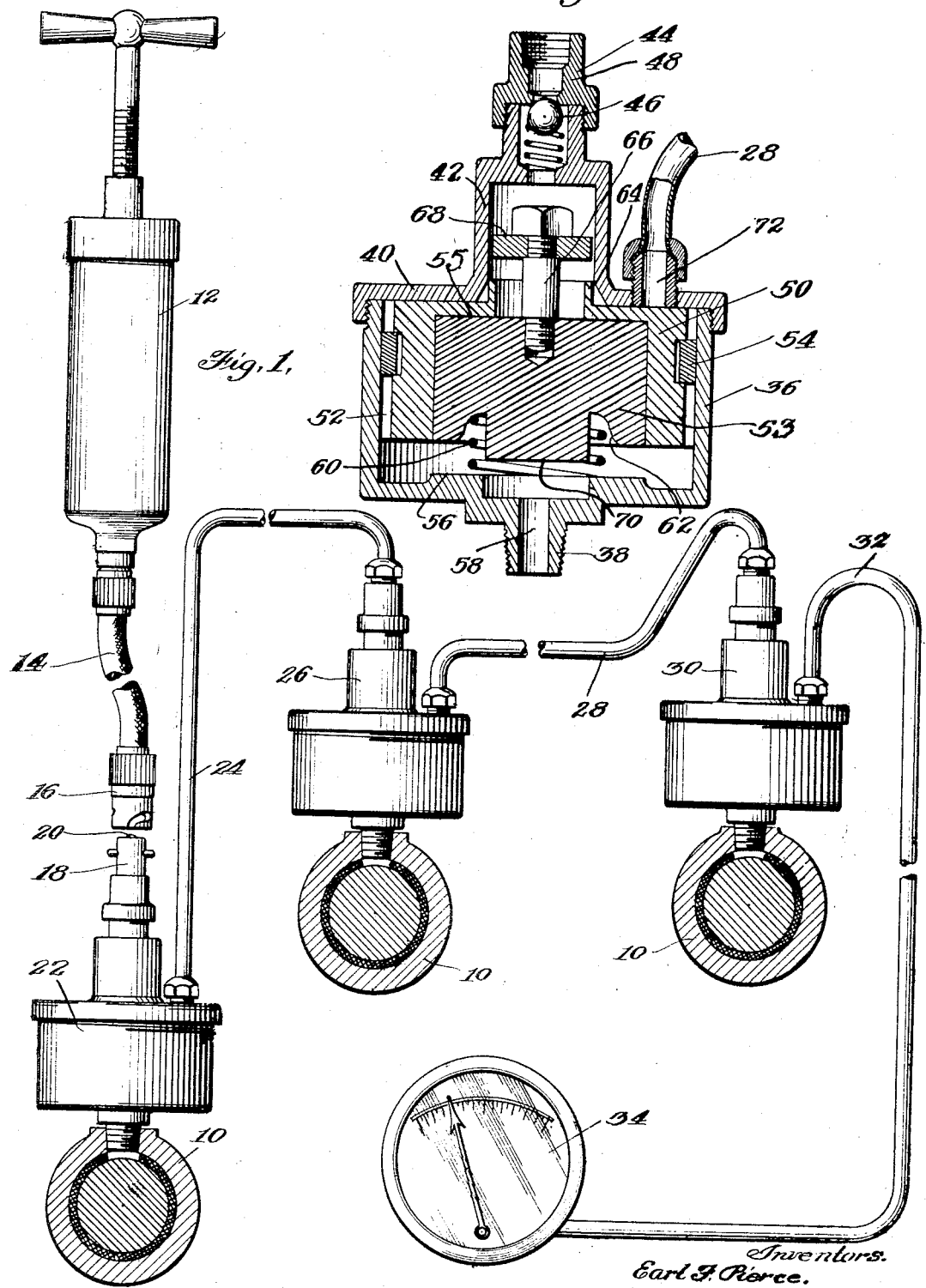
Inventors.
Earl F. Pierce.
Donald H. Sweet.
By Pierce and Sweet attys.

Patented Dec. 30, 1930

1,786,548

UNITED STATES PATENT OFFICE

EARL F. PIERCE, OF WINNETKA, AND DONALD H. SWEET, OF EVANSTON, ILLINOIS, ASSIGNORS TO ALEMITE CORPORATION, OF CHICAGO, ILLINOIS, A CORPORATION OF DELAWARE

PRESSURE LUBRICATING SYSTEM

Application filed April 27, 1925. Serial No. 26,191.

Our invention relates to lubrication and more specifically to an improvement in pressure lubricating systems of a more or less centralized type.

Among the objects and advantages of the invention may be enumerated:

First, to lubricate a plurality of bearings progressively or seriatim from a single pressure source by a single application of pressure.

Second, to automatically indicate to the operator the completion of the work.

Third, to automatically apportion a predetermined dose of lubricant to each of a series of parts to be lubricated, and to indicate completion of the work to the operator.

Fourth, to reduce to a minimum the length of the conduit necessary for conveying an individual charge of lubricant to each of a plurality of bearings or the like.

Further objects and advantages of the invention will become apparent as the description proceeds.

In the accompanying drawings:

Figure 1 is a more or less diagrammatic side view of a complete system according to the invention.

Figure 2 is an enlarged section through one of the measuring and controlling devices.

In the embodiment of the invention selected for illustration a plurality of different machine elements 10 are indicated, which require lubrication in predetermined amounts at periodical intervals. This lubricant may be delivered by any suitable means such as the compressor 12 of a well known type having a flexible hose 14 terminating in a coupling 16 adapted to engage the fitting 18 provided with a check valve at 20 for retaining the lubricant forced into it.

According to the invention we provide unitary means at each bearing actuated solely by the pressure fluid delivered to said means for first discharging into said bearing the predetermined amount of lubricant it should receive and then cutting off said bearing and connecting the next device to receive the pressure fluid. Thus the first device 22 will lubricate its bearing and then connect the pipe 24 to the source of pressure fluid to deliver the fluid to the device 26. The device 26 in its turn lubricates its own bearing and then connects the conduit 28 to deliver lubricant to the device 30. After lubricating its bearing the device 30 connects the pipe 32 to the source of pressure fluid, and in case this is the last bearing of the series, the conduit 32 will lead to a suitable pressure gauge 34.

Referring now to Figure 2 the device 26 comprises a cup shaped casing 36 threaded at 38 to screw it into a bearing and a cover 40 having a dome 42. The terminal connector 44 also forms a seat for a spring-pressed ball check valve 46 located in the upper end of dome 42.

Within the casing we provide a sleeve valve 50 having peripheral notches at 52 to permit lubricant to pass around the outside, and a partial ring 54 similar to a piston ring pressing against the wall of the casing 36 to provide frictional resistance against the movement of the sleeve 50. A piston 53 is slidable inside the sleeve 50 between an abutment 55 formed by an inwardly extending shoulder on the sleeve and a boss 56 on the bottom of the casing 36, which limits the movement of the piston toward the outlet 58. A coil spring 60 housed in an annular groove 62 in the piston normally pushes the parts toward the position shown in Figure 2. The shoulder at 55 terminates in a collar 64 having sealing engagement with the inner wall of the dome 42. A central bolt 66 carries a cross piece 68 adapted to abut the upper edge of the collar 64 and form a lost motion connection between the piston 52 and the sleeve 50.

When a pressure impulse is received, the check valve 46 opens and the piston 53 moves down, but not the sleeve 50. This movement continues until the boss 70 in the bottom of the piston is well entered in the outlet 58, at which time the cross piece 68 engages the collar and constrains the sleeve 50 to move down with the piston during the remainder of the stroke. This movement of the sleeve 50 opens a passage from the dome 42 over the top of the sleeve, and uncovers a second outlet 72 connected to the conduit 28. Thus, while outlet 58 is completely shut off, the conduit 28 is in open communication with the source of pressure fluid. This condition will remain as long as the pressure is maintained.

As soon as the pressure is relieved, the piston 53 will first move to withdraw the boss 70 from the outlet 58 and engage the abutment 55, and during the rest of the return movement to the position shown in Figure 2 the lubricant above the piston and valve moves around them into the bottom of the casing, thus replacing the lubricant discharged through outlet 58 when the pressure was first delivered to the device.

It will be noted that the clearance between cross piece 68 and neck 64 is materially greater than that between extension 70 and the exit. Extension 70 has a material clearance and a tight seal is formed only at the end of the stroke by contact with the upper face of the boss 56.

The devices 26 and 30 are identical with the foregoing description, and the device 22 differs only in the provision of the receiving fitting 18 instead of being connected to a conduit 24. The fitting 18 should preferably be put in a position of maximum convenience for the operator, and it will be obvious that in case none of the bearings 10 happen to occupy such a position, the fitting 18 may be mounted anywhere and connected to the first lubricating device by a suitable conduit.

In using the system the operator merely connects the compressor to the fitting 18 and injects lubricant continuously until the pressure gauge 34 registers a rise in pressure, which indicates that all of the lubricating devices in the series have delivered their quota of lubricant, and the operation is complete.

Without further elaboration the foregoing will so fully explain the gist of our invention that others may, by applying current knowledge, readily adapt the same for use under various conditions of service. Many adaptations and alterations may readily be adopted by those skilled in the art without eliminating certain features which may properly be said to constitute the essential items of novelty involved, which items are intended to be defined and secured to us by the following claims.

We claim:

1. A pressure lubricating system comprising a plurality of machine elements to be lubricated, a single conduit communicating with all said elements, supply means for delivering lubricant under pressure to one end of said conduit, and valve control devices in the conduit adjacent each element, each device normally cutting off that portion of the conduit more remote from the supply and operating under a pressure impulse first to deliver a measured quantity of lubricant to its own element and second to cut off its element and simultaneously open the conduit beyond, and pressure indicating means at the end of the conduit beyond the last device.

2. A pressure lubricating system comprising a plurality of machine elements to be lubricated, a single conduit communicating with all said elements, supply means for delivering lubricant under pressure to one end of said conduit, and valve control devices in the conduit adjacent each element, each device comprising a reciprocable member normally cutting off that portion of the conduit more remote from the supply and operating under a pressure impulse first to deliver a measured quantity of lubricant to its own element and second to cut off its element and simultaneously open the conduit beyond.

3. A pressure lubricating system comprising a plurality of machine elements to be lubricated, a single conduit communicating with all said elements, supply means for delivering lubricant under pressure to one end of said conduit, and valve control devices in the conduit adjacent each element, each device normally cutting off that portion of the conduit more remote from the supply and operating under a pressure impulse first to deliver a measured quantity of lubricant to its own element and second to cut off its element and open the conduit beyond.

4. A pressure lubricating system comprising a plurality of machine elements to be lubricated, conduit means communicating with all said elements, supply means for delivering lubricant under pressure to said conduit means, and valve control devices in the conduit means adjacent each element, one of said devices normally cutting off another device more remote from the supply and operating under a pressure impulse first to deliver a measured quantity of lubricant to its own element and second to cut off its element and open the conduit means to said other device.

5. A pressure lubricating system comprising a plurality of machine elements to be lubricated, supply means for delivering lubricant under pressure, and control devices connected therewith, one of said devices operating first to deliver a measured quantity of lubricant to its element and second to cut off its element and open communication to the next device.

6. A pressure lubricating system comprising a plurality of machine elements to be lubricated, supply means for delivering lubricant under pressure, and valve control devices, each device normally cutting off all devices more remote from the supply and operating first to deliver a measured quantity of lubricant to its machine element and second to open communication to the next device.

7. A pressure lubricating system comprising a plurality of machine elements to be lubricated, supply means for delivering lubricant under pressure and a series of devices comprising control devices and a pressure indicator, each control device normally cutting off all devices more remote from the supply and operating first to deliver lubricant to its bearing and second to establish an operative connection with the next device, said pressure indicating means being at the end of the series.

8. A lubricant measuring device having a casing with an inlet and two outlets, mechanism in said casing operated by pressure fluid entering said inlet, for delivering a predetermined charge through one outlet and then closing the same and placing the other outlet in open communication with said inlet as long as the pressure is maintained, and means for returning said mechanism to initial position when the pressure is relieved.

9. A lubricant measuring device having a casing with an inlet and two outlets, and mechanism in said casing operated by pressure fluid entering said inlet, for delivering a predetermined charge through one outlet and then closing the same and placing the other outlet in open communication with said inlet.

10. A lubricant measuring device having an inlet and two outlets, a first and a second slidable element in said casing, said first element operating to open and close one outlet, and said second element operating to open and close said second outlet and a passage around said first element simultaneously, a lost motion mechanical connection between said elements, and means acting on said first element for returning both elements to a normal position with said first outlet open and said passage and second outlet closed.

11. A lubricant measuring device having an inlet and two outlets, a first and a second slidable element in said casing, said first element operating to open and close one outlet, and said second element operating to open and close said second outlet and a passage around said first element simultaneously, and a lost motion mechanical connection between said elements.

12. A lubricant measuring device comprising a casing having an inlet and two outlets, a sleeve valve axially slidable in said casing, a piston slidable in said valve, a spring urging said piston toward said inlet, said sleeve valve having a shoulder abutting the inlet end of said piston, whereby pressure fluid delivered through said inlet tends to separate said valve and said piston, friction means resisting movement of said valve with respect to said casing, and a lost motion mechanical connection between said piston and said valve, said valve opening one of said outlets and a path around said piston when moved away from the inlet, and closing them when moved back toward the inlet, said piston on movement away from the inlet closing the other outlet before said valve opens.

13. A lubricant measuring device comprising a casing having an inlet and two outlets, a sleeve valve axially slidable in said casing, a piston slidable in said valve, a spring urging said piston toward said inlet, said sleeve valve having a shoulder abutting the inlet end of said piston, whereby pressure fluid delivered through said inlet tends to separate said valve and said piston, and a lost motion mechanical connection between said piston and said valve, said valve opening one of said outlets and a path around said piston when moved away from the inlet, and closing them when moved back toward the inlet, said piston on movement away from the inlet closing the other outlet before said valve opens.

14. A lubricant measuring device comprising a casing having an inlet and two outlets, a sleeve valve axially slidable in said casing, a piston slidable in said valve, a spring urging said piston toward said inlet, friction means resisting movement of said valve with respect to said casing, and a lost motion mechanical connection between said piston and said valve, said valve opening one of said outlets, and a path around said piston when moved away from the inlet, and closing them when moved back toward the inlet, said piston on movement away from the inlet closing the other outlet before said valve opens.

15. A lubricant measuring device comprising a casing having an inlet and two outlets, a sleeve valve axially slidable in said casing, a piston slidable in said valve, a spring urging said piston toward said inlet, and a lost motion mechanical connection between said piston and said valve, said valve opening one of said outlets, and a path around said piston when moved away from the inlet, and closing them when moved back toward the inlet, said piston on movement away from the inlet closing the other outlet before said valve opens.

16. A lubricating system comprising a plurality of elements to be lubricated, a source of lubricant under pressure, a single conduit connecting said source with said elements in series, and means operable automatically upon discharge of lubricant under pressure from said source to said conduit to supply a measured charge from said source to said first element and then successively to each of the remaining elements.

17. A lubricating system comprising a plurality of elements to be lubricated, a conduit connecting said elements in series, a source of lubricant under pressure, and means operable automatically upon discharge of lubricant under pressure from said source to said conduit to supply a measured charge from said source to the first of said elements and then successively to each of the remaining elements.

18. A pressure lubricating system comprising a plurality of machine elements to be lubricated, supply means for delivering lubricant under pressure, a series of control devices one adjacent each element, each of said devices being operable by a lubricant pressure impulse when the device is in normal condition, first to deliver a measured quantity of lubricant to its adjacent element, and second to cut off its element and establish an operative connection between said supply means and the next device of the series, and resilient means to return said device to normal condition.

19. In combination, a source of liquid under pressure, a plurality of measuring devices connected in series and adapted to be progressively operated by liquid under pressure from said source, and an indicator operated by liquid pressure, connected to the last device of the series, and adapted to be connected to said source upon operation of said last device.

20. In a lubricating system, the combination of a source of lubricant under pressure, a series of measuring devices, means connecting the first of said devices with said source, means in each of said devices operative successively to connect the next adjacent device with said source, and a pressure indicator adapted to be connected with said source by said means in the last device of the series.

21. A lubricating system comprising a plurality of bearings to be lubricated, a source of lubricant under pressure, a measuring device associated with each of said bearings, conduits connecting said devices in series, and means in said devices operative upon a lubricant pressure impulse to force a measured charge to its associated bearing and open the one of said conduits leading to the next device of the series.

22. In a lubricating system of the class described, the combination of a series of measuring devices each having an inlet and two outlets, means in each of said devices operative upon application of liquid under pressure to the inlet to force a charge of the liquid from one outlet of the device and connect the second outlet with the inlet, and conduit means connecting said second outlet with the inlet of the next device in series.

23. In a lubricating system, the combination of means for supplying lubricant under pressure at intervals, a plurality of lubricant measuring devices each associated with a part to which lubricant is to be supplied, conduits connecting said means with one of said devices and connecting said last named device with another of said devices, and means in said devices operative upon supply of lubricant under pressure to force a quantity of lubricant to its associated part to be lubricated and thereafter to connect said means to an adjacent device to operate the latter.

24. A lubricant measuring device comprising a closed body normally containing lubricant and having three ports, the first of said ports being connected to a part to be lubricated, and movable valve means in said body operable upon forcing lubricant under pressure into said body through the second of said ports to force a predetermined quantity of lubricant from said body to the part to be lubricated and thereafter opening a passageway through said body to the third of said ports, thereby to permit flow of lubricant through said second port, said body and said third port.

25. A lubricant measuring device adapted to be connected with another measuring device, comprising a casing having an inlet and two outlets, means for connecting one of said outlets to a part to be supplied with lubricant, the other of said outlets being adapted to be connected to said other measuring device, and said inlet to a source of lubricant under pressure, and means in said casing operative upon reception of lubricant under pressure through said inlet to force a measured charge of lubricant to said part through one of said outlets and to connect said inlet with the other of said outlets.

26. A lubricating system comprising a plurality of parts to be lubricated, a single conduit, a plurality of lubricant measuring devices, one associated with each of said parts, connected serially in said conduit and each device normally interrupting free flow of lubricant therethrough and through said conduit, means for supplying lubricant under pressure to said conduit, means in each of said devices operated by lubricant under pressure supplied through said conduit to force a measured charge of lubricant to its associated bearing and then open a passageway interconnecting the portions of the conduit adjacent the device, and an indicator at the end of said conduit.

In witness whereof, we hereunto subscribe our names this 23d day of April, 1925.

EARL F. PIERCE.
DONALD H. SWEET.